Jan. 5, 1926.
D. P. OWENS
UNIVERSAL JOINT
Original Filed July 12, 1924
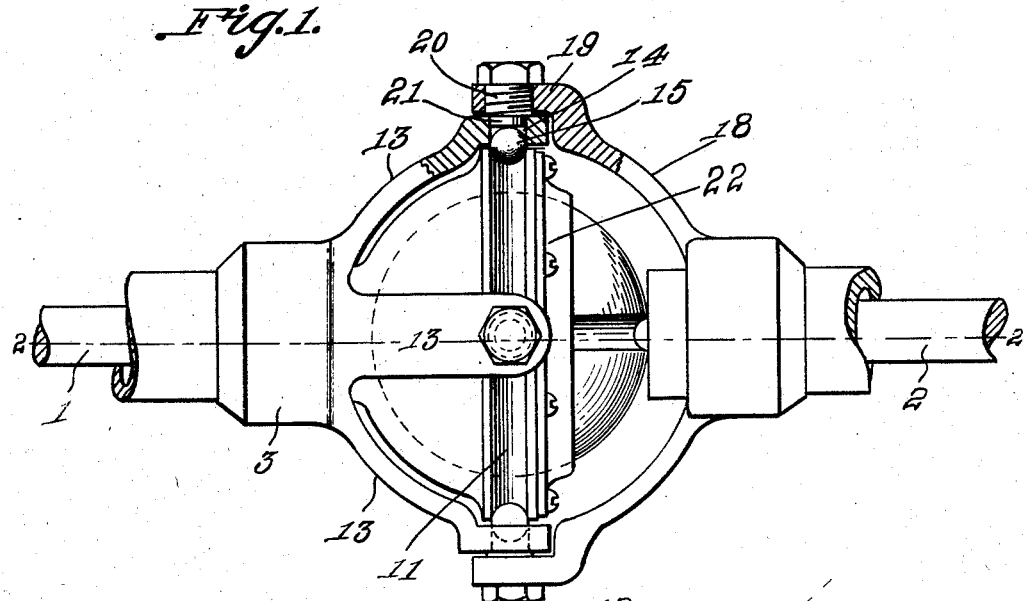
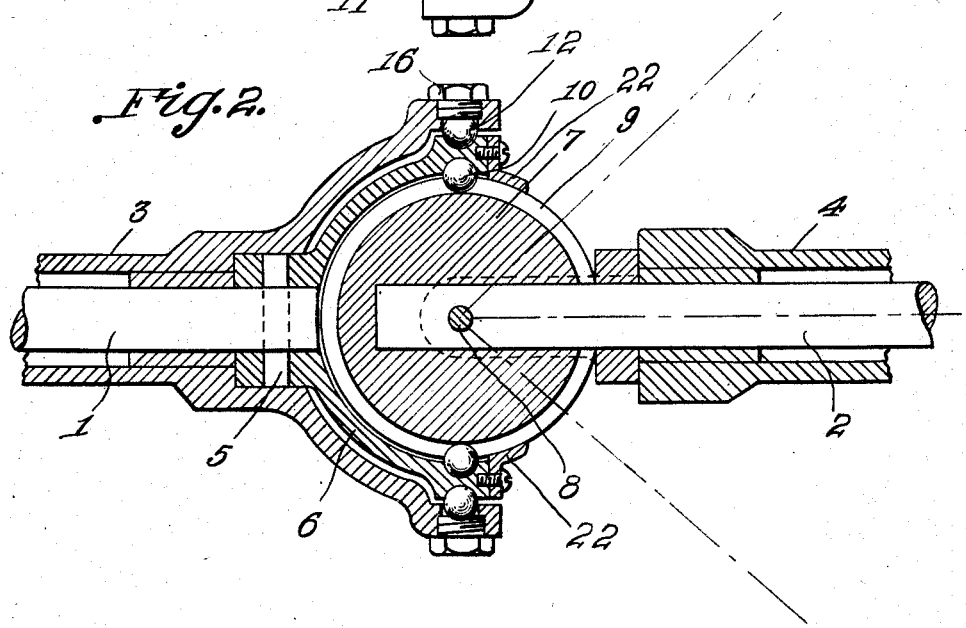
D. P. Owens
INVENTOR
BY Victor J. Evans
ATTORNEY
WITNESS:

Patented Jan. 5, 1926.

1,568,914

UNITED STATES PATENT OFFICE.

DABNEY P. OWENS, OF LAKE WORTH, FLORIDA.

UNIVERSAL JOINT.

Application filed July 12, 1924, Serial No. 725,626. Renewed November 9, 1925.

*To all whom it may concern:*

Be it known that I, DABNEY P. OWENS, a citizen of the United States, residing at Lake Worth, in the county of Palm Beach and State of Florida, have invented new and useful Improvements in Universal Joints, of which the following is a specification.

My present invention has reference to a universal ball and socket gear or connection between a drive and a driven shaft, and has for its objects the provision of means for affording a wide range of angular relation between the driven and the drive shafts; in which friction between parts is reduced to a minimum, and in which the construction is comparatively simple and may be readily hitched or secured between the confronting ends of the shafts.

With the above broadly stated objects in view, and others which will present themselves as the nature of the invention is better understood, reference is to be had to the drawing which accompanies and which forms part of this application.

In the drawing:—

Figure 1 is a side elevation of my improvement, parts being in section.

Figure 2 is a sectional view on the line 2—2 of Figure 1.

In the drawing, a drive shaft is indicated by the numeral 1, and a shaft to be driven thereby by the numeral 2. Each of the shafts is enclosed in a housing, 3 and 4 respectively.

Having its hub received in the widened outer bore of the housing 3, and secured to the drive shaft by means 5 there is a ball socket 6. The ball which is received in the socket is indicated by the numeral 7, the same being provided with a central opening in which is received the projecting end of the driven shaft 2. The driven shaft is secured in the socket of the ball head 7 therefor by means 8.

The ball head 7 of the driven shaft is centrally formed with an annular groove 9 arranged rightangularly with respect to the pivot 8, and the socket 6 is provided with oppositely arranged cup-shaped depressions providing seats for anti-frictional balls 10, the same being also received in the groove 9 of the ball head.

The socket 6 has its outer and open end thickened outwardly and is provided with an annular depression 11 providing a guide or raceway for anti-frictional balls 12.

The end of the shaft housing 3, in which the hub of the socket 6 is received, is formed with outwardly directed curved arms arranged rightangularly with respect to each other to provide spaced pairs which are indicated for distinction by the numeral 13. The rightangularly disposed curved arms 13 have their ends straight, one pair of the ends of the oppositely arranged arms being provided with round openings 14, and in these openings there are seated balls 15 which are also received in the groove 11 of the head of the driven shaft. The second pair of arms 13 have their ends also provided with openings; the latter, however, being threaded and have screwed therein short headed bolt members 16, the inner faces of which being concaved to provide pockets for the anti-frictional balls 12.

The end of the housing 4 for the driven shaft, provided with the ball or sphere head 7, is formed with a pair of oppositely disposed arched arms 18. The ends of these arms are offset but provided with straight extensions which overlie the straight extensions on the arms 13 of the housing 3 provided with the openings 14. The straight extensions 19 of the arms 18 are provided with threaded openings and in each of these openings there is screwed a short headed bolt 20. Each of the bolts 20 has a reduced extension 21 that contacts with the anti-frictional balls 15.

With a construction as above described it will be seen that the balls 15 provide gripping members for locking the driven shaft 2 to the drive shaft 1. It will be further noted that a wide range of angular relation between the driven and the drive shaft is afforded by the ball 7 traveling in the annular groove 9 of the spherical head 7 for the driven shaft 2.

If desired, and as disclosed by the drawings, I may secure a ring plate 22 to the outer face of the ball socket 6. The plate is formed with an outwardly extending concaved flange to embrace the ball 7. By this construction the arms 18 may be dispensed with and the driven shaft 2 is permitted to rotate in a circular direction.

It is believed that the foregoing description, when taken in connection with the drawings, will fully set forth the construction, operation and advantages of my improvement to those skilled in the art to which such inventions relate.

Having described the invention, I claim:—

1. The combination with a housed drive shaft and a housed shaft to be driven thereby, of a universal connection between said shafts, comprising a spherical head on the end of the driven shaft having a peripheral annular groove, a socket secured on the end of the drive shaft receiving the head therein, ball members pocketed in the housing and received in the groove of the head, said socket having an outer peripheral groove, the drive shaft housing having rightangularly disposed curved arms arranged over the socket, anti-frictional balls carried by the arms and received in the groove of the socket, means on the ends of two of the oppositely disposed arms holding the balls in the groove, the driven shaft having a pair of oppositely disposed arcuate arms overlying two of the first mentioned arms, means passing through the ends of the said arms connecting the same together and holding the balls in the groove of the socket, all as and for the purpose set forth.

2. The combination with a housed drive shaft and a shaft to be driven thereby, of a universal connection between the shafts, comprising a spherical head secured to the driven shaft and having a peripheral groove therein, a socket on the end of the drive shaft and receiving the spherical head therein, a plate secured to the outer end of the socket having a flange surrounding the spherical head, balls pocketed in the socket and received in the groove of the head, said socket having a peripheral groove inward of the plate, rightangularly disposed curved arms on the drive shaft housing, anti-frictional balls carried by the arms and received in the groove of the socket and adjustable means holding the balls for free rotation on the arms and in the groove.

In testimony whereof I affix my signature.

DABNEY P. OWENS.